United States Patent

Beldycki

[11] Patent Number: 5,873,536
[45] Date of Patent: Feb. 23, 1999

[54] AUXILIARY CASTING REEL AND SUPPORTIVE MOUNTING ATTACHMENT THEREFOR

[76] Inventor: Wojciech Beldycki, 936 Riviera St., Venice, Fla. 34285

[21] Appl. No.: 939,999

[22] Filed: Sep. 29, 1997

[51] Int. Cl.[6] .................................................. A01K 89/00
[52] U.S. Cl. ............................................ 242/323; 242/229
[58] Field of Search ................................... 242/229, 322, 242/323

[56] References Cited

U.S. PATENT DOCUMENTS

| | | | |
|---|---|---|---|
| 1,151,349 | 8/1915 | Flegel | 242/323 |
| 1,577,035 | 3/1926 | Klein | 242/323 |
| 2,145,966 | 2/1939 | Bedell | 242/323 |
| 2,230,940 | 2/1941 | Ellsworth | 242/323 |
| 2,564,086 | 8/1951 | Von Beck | 242/323 |
| 2,731,756 | 1/1956 | Nelson . | |
| 2,890,004 | 6/1959 | Whitbeck . | |
| 3,237,900 | 3/1966 | Odom | 242/323 |
| 3,711,036 | 1/1973 | Spraggins . | |

*Primary Examiner*—John P. Darling
*Attorney, Agent, or Firm*—Charles J. Prescott

[57] ABSTRACT

In combination, an auxiliary casting reel and supportive mounting attachment for a conventional winding reel or boat-type fishing reel having two spaced apart plates connected together by evenly spaced elongated transverse frame posts. The auxiliary casting reel includes an auxiliary spool generally similar to that of a spinning-type fishing reel and preferably having a flat back plate and a spaced conical shaped front face which facilitates free spool casting. The mounting attachment includes an elongated adapter pivotally connected at one end to a spool extension of the auxiliary spool, the adapter having spaced parallel first and second grooves sized in width and length to dependently engage against adjacent frame posts. A thumb screw secures the second groove around one frame post after the first groove is self-aligningly engaged against another frame post.

2 Claims, 4 Drawing Sheets

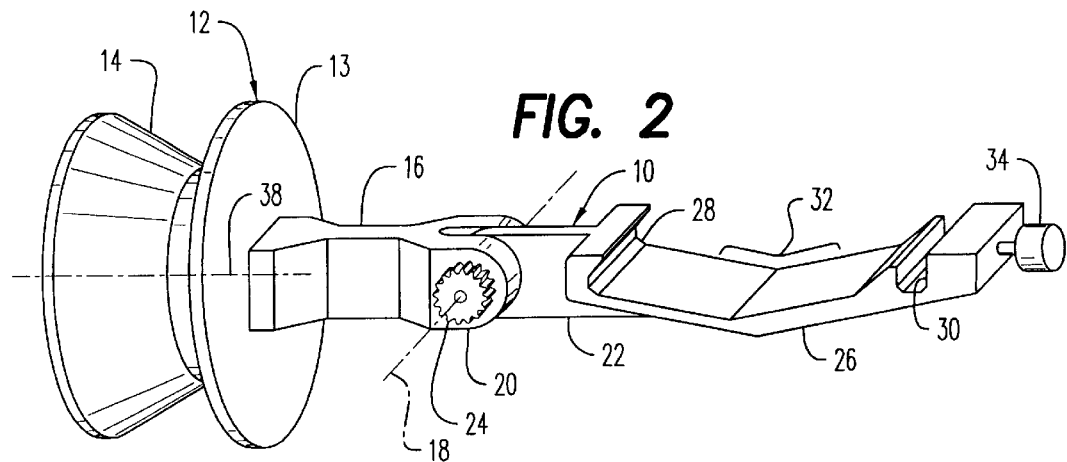
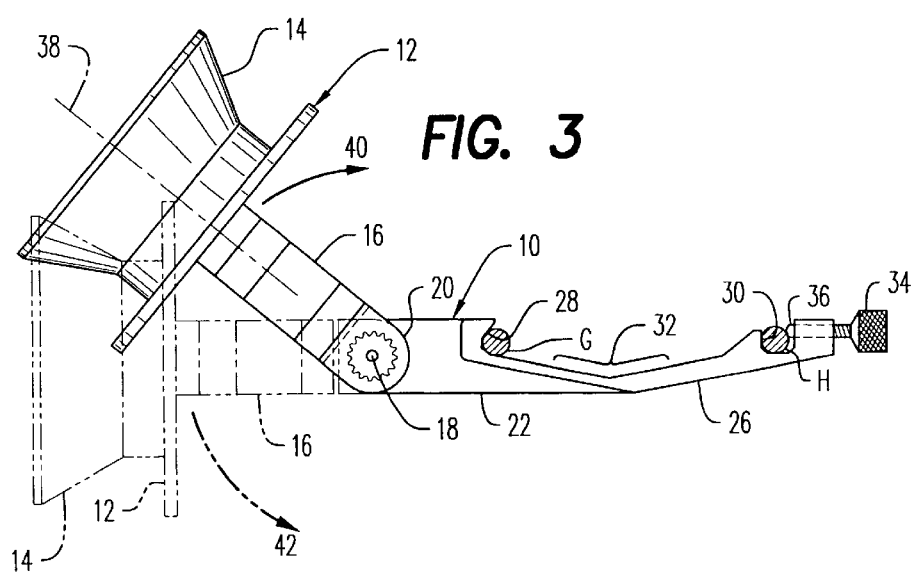

5,873,536

AUXILIARY CASTING REEL AND SUPPORTIVE MOUNTING ATTACHMENT THEREFOR

BACKGROUND OF THE INVENTION

1. Scope of the Invention

This invention relates generally to auxiliary spinning reels used in conjunction with conventional fishing rods and winding reels, and particularly to an auxiliary spool which will easily connect to such conventional fishing reels without the need for tools or reel modification.

2. Prior Art

Spinning reels are well known in the fishing industry as having exceptionally improved casting ability of baits and lures over that of a conventional winding reel. However, in larger sizes of both line and reel, particularly for those used for larger ocean fish, the size, complexity and cost of spinning reels become prohibitive for such use.

Conventional winding reels for catching larger fish in conjunction with heavier fishing line and fishing poles such as might be used from a dock or shoreline exhibit very limited ability to cast a bait or a lure very far. Rather, such fishing gear is typically best used from a boat wherein the bait or lure is simply dropped over the side or dragged behind the boat without the need for casting.

Thus, there exists a need for improved casting of bait and lures while fishing from a dock, a shoreline, pier or bridge where conventional winding reels are otherwise required because of the increased size of line, lure, fish and fishing rods.

One response to this need is disclosed in U.S. Pat. No. 2,731,756 which teaches an auxiliary spinning reel invented by Nelson. This apparatus is connectable to the fishing pole ahead of the winding reel by a tubular shaped bracket and thumb screw arrangement which supportively clamps a bracket of an open, non-rotating spinning spool onto the fishing pole. Positioned ahead of the conventional winding reel, a quantity of fishing line may be wound around the auxiliary spool which will allow for much freer spooling of line and for enhanced casting characteristics. The auxiliary spool may be deflected slightly by resilient deformation of the support bracket to alter or stop line payout. However, further positioning of this auxiliary spool is not possible.

Whitbeck, in U.S. Pat. No. 2,890,004, teaches an auxiliary spool connectable onto a conventional winding reel of a fishing rod which utilizes a specialized support bracket requiring partial disassembly of the spool holding side plates and spaced frame posts. A pivotally movable line guiding member controls line payout, the auxiliary spool otherwise remaining stationarily positioned with respect to the fishing reel.

In U.S. Pat. No. 3,711,036, Spraggins teaches a fishing reel adapted to be used as a holder for slack line ahead and generally aligned with of the main reel. The apparatus appears to be virtually an entire secondary fishing reel which is connectable onto the fishing pole directly ahead of the conventional reel and includes a small secondary spool which facilitates hook setting and reeling of the line onto and from the secondary fishing reel.

The present invention provides a much simpler arrangement of auxiliary fishing spool and attaching support adapter which easily is connected in very positive fashion to adjacent spaced frame posts of a conventional winding fishing reel. The auxiliary spool and spool extension are pivotally connected to the adapter so that the auxiliary spool may easily be pivotally positioned in small increments to vary line payout and then away from the reel to facilitate line winding or temporary storage.

BRIEF SUMMARY OF THE INVENTION

This invention is directed to in combination, an auxiliary casting reel and supportive mounting attachment for a conventional winding reel or boat-type fishing reel having two spaced apart plates connected together by evenly spaced elongated transverse frame posts. The auxiliary casting reel includes an auxiliary spool generally similar to that of a spinning-type fishing reel and preferably having a flat back plate and a spaced conical shaped front face which facilitates free spool casting. The mounting attachment includes an elongated adapter pivotally connected at one end to a spool extension of the auxiliary spool, the adapter having spaced parallel first and second grooves sized in width and length to dependently engage against adjacent frame posts. A thumb screw secures the second groove around one frame post after the first groove is self-aligningly engaged against another frame post.

It is therefore an object of this invention to provide an auxiliary fishing reel having an auxiliary spool which carries a quantity of fishing line normally stored on the reel of a conventional winding-type fishing reel to facilitate casting or bait or lure.

It is another object of this invention to provide an auxiliary fishing reel which is easily connectable onto a conventional winding reel to facilitate casting of bait and lures thereby.

It is still another object of this invention to provide a very easily manufacturable auxiliary fishing reel for enhanced casting of bait and lures which is easily positionable out of the way when not in use or for winding fishing line.

In accordance with these and other objects which will become apparent hereinafter, the instant invention will now be described with reference to the accompanying drawings.

BRIEF DESCRIPTION OF THE DRAWINGS

FIG. 2 is a perspective view of the invention as shown in FIG. 1.

FIG. 3 is a side elevation view of FIG. 2 showing the pivotal positioning of the auxiliary spool and spaced apart frame posts of the conventional fishing reel attached thereto shown in section.

DETAILED DESCRIPTION OF THE INVENTION

Figure 1:
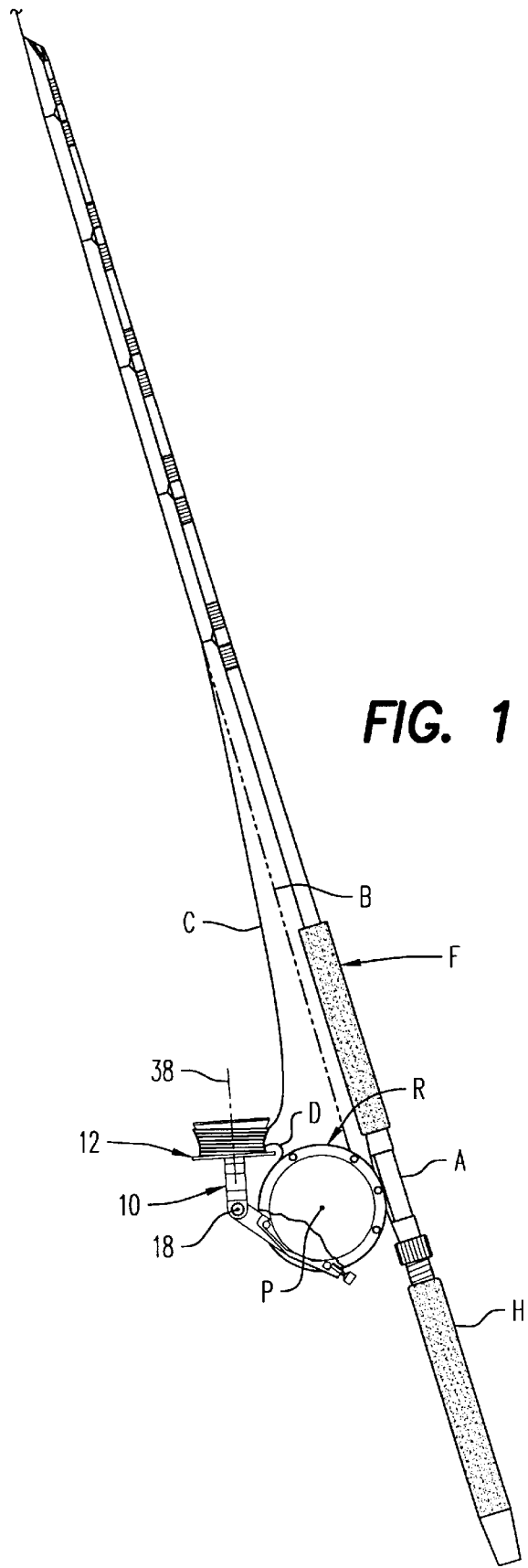
FIG. 1 is a side elevation partially broken view of the preferred embodiment of the invention attached to a conventional winding reel and associated fishing pole.

Referring now to the drawings, a conventional fishing pole is shown generally at numeral F with the conventional winding-type fishing reel R attached by a foot N thereof to a central uncovered portion A of the handle H of the fishing pole F. The fishing reel R as better seen in FIG. 4, includes two spaced apart side plates S which are positioned and held astride either side of a conventional winding spool (not shown) which is held for rotation about transverse axis P. The side plates S are held in spaced apart relationship by a series of generally evenly spaced elongated frame posts shown typically at G and H. A winding handle which rotates the winding spool is not shown for clarity. In normal use of the fishing reel R, the fishing line extends in tangent fashion from one side or the other of the winding spool (not shown) such as at B and is fed through the eyelets of the fishing pole F.

The invention in its preferred embodiment is shown generally at numeral 10 in FIGS. 1 to 4 and generally includes an auxiliary spool 12 having a spool extension 16 extending longitudinally along axis 38 from a flat back plate 13. The auxiliary spool 12, preferably molded of plastic material, also includes a conically shaped forwardly disposed front portion 14, fishing line being manually windable thereon between back plate 13 and conical forward portion 14. The spool extension 16 extends for pivotal connection by threaded hand fastener 24 about a transverse axis 18 which interconnects one end portion 22 of an elongated molded plastic adapter 26. It is this adapter 26 which presents a very unique aspect of the present invention described herebelow.

Figure 4:
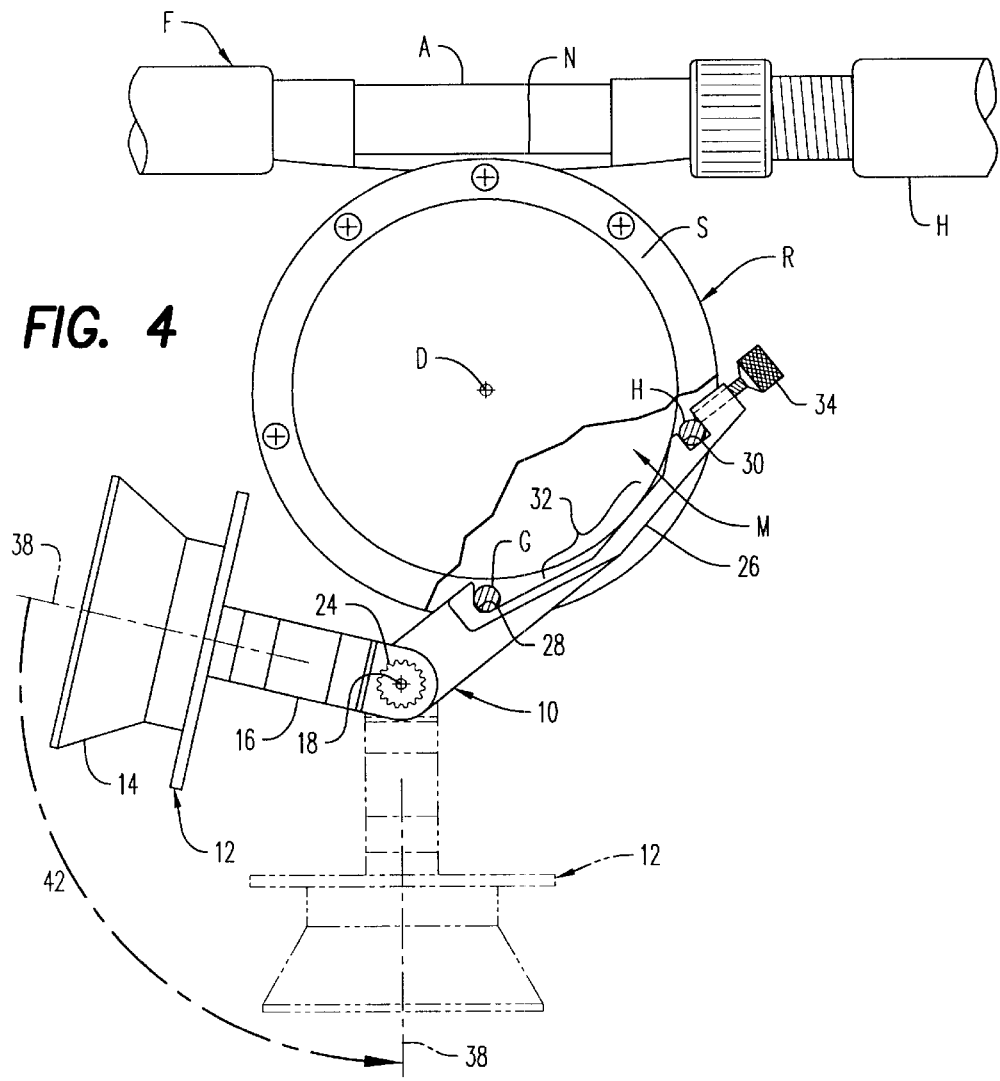
FIG. 4 is an enlarged side elevation partially broken view of a portion of FIG. 1.

The adapter 26 includes an elongated central portion 32 which is contoured to provide clearance to the conventional winding reel of the fishing reel R. This adapter 26 also includes first and second grooves 28 and 30, respectively, each of which are sized and shaped for mating engagement against the frame posts G and H best seen in FIGS. 3 and 4. These frame posts G and H of fishing reel R are typically cylindrical in cross section and relatively evenly spaced around the periphery of each of the side plates S as seen in FIGS. 1 and 4. By selecting the two frame posts G and H which are oriented generally furthest away from the fishing pole F and foot or mounting bracket N of FIG. 4, the first groove 28 which generally faces or opens toward second groove 30, is first engaged against frame post G. Thereafter, as seen in FIG. 4, the adapter 26 is rotated about frame post 28 in the direction of arrow A so that the second groove 30 which faces or opens generally laterally with respect to the length of adapter 26 and the first groove 28, engages around frame post H. When in this position, a conventional thumb screw 34 is tightened to lock its distal end 36 against frame post H to secure this arrangement.

The spool extension 16 may then be pivoted about axis 18 in the direction of arrow 42 and back in the direction of arrow 40 so as to selectively position the auxiliary spool 12 either in an upper in-use position as shown in FIGS. 1 and 4, or in a lower in-use position or out of the way as shown in phantom in FIG. 4. Thumb screw 24 is provided to vary the pivotal friction at this joint 20 and for disassembly when removed. When in the lower in-use position in phantom in FIG. 4, a desired quantity of fishing line which extends from the reel R at B may be manually wrapped around or loaded onto the auxiliary spool 12 and then extended as at C through the eyelets of the fishing pole F.

It should be understood by this arrangement that no physical alteration, disassembly, line removal or the like is required whatsoever of the fishing pole F or fishing reel R in order to utilize the present invention 10. Because the groove 28 and 30 are oriented facing generally orthogonally to one another, spaced and selectively shaped as previously described, easy locking engagement of the device 10 onto the frame posts G and H is quick and effective. The user only need pivot the spool extension 16 about transverse axis 18 as desired, preferably in the position shown in FIG. 1, after the desired quantity of the fishing line has been manually wrapped around the auxiliary spool 12. Free casting of a bait or lure is then effected as desired, after which excess line may be manually taken up either onto auxiliary spool 12 or paid out in its entirety from the auxiliary spool 12 and then would onto the conventional winding spool of fishing reel R.

Figure 5:
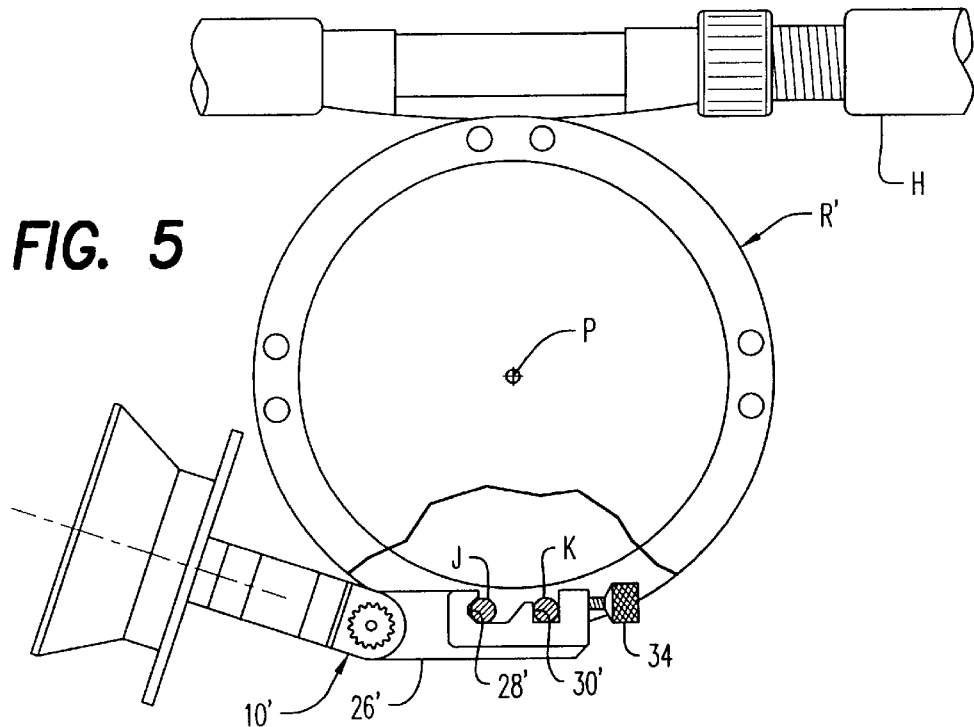
FIG. 5 is a view similar to FIG. 4 of an alternate form of the invention adapted to an alternate conventional fishing reel configuration.

Referring now to FIG. 5, an alternate adaptation 10' is there shown to accommodate an alternate spacing of frame posts shown typically at J and K. This conventional winding fishing reel R' represents an alternate configuration from another reel manufacturer and is easily dealt with under the present invention by adapting the spacing between grooves 28' and 30' of adapter 26', installation and locking features as previously described being equally applicable wherein thumb screw 34 tightens and secures the final arrangement as shown.

Figure 6:
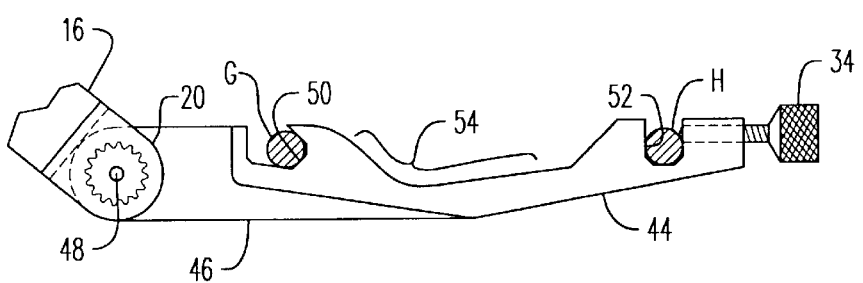
FIG. 6 is a side elevation view of an alternate embodiment of the adapter shown in FIG.

Referring lastly to FIG. 6, although it is preferred for the first groove 28 or 28' to generally face or open toward the second groove 30 or 30' as previously described, having the first groove 50 facing away from the second groove 52 will facilitate a similar locking engagement without alteration of the conventional fishing reel R. In this embodiment of adapter 44, the first groove 50 then faces generally away from the second groove 52 which correspondingly still faces laterally with respect to the length of the adapter 44 and the first groove 52. The central contour 54 is again provided for relief from interference with any of the components of the fishing reel R' while adapter portion 46 pivotally engages about transverse axis 48 with the distal end 20 of spool extension 16.

Note that the configuration and arrangement of the first and second grooves prevents damaging deflection of either of the frame posts to which they supportively engaged, the deflection being generally limited to the clearance between the side walls of the second groove and the frame post positioned and secured therein.

While the instant invention has been shown and described herein in what are conceived to be the most practical and preferred embodiments, it is recognized that departures may be made therefrom within the invention, which is therefore not to be limited to the details disclosed herein, but is to be afforded the full scope of the claims so as to embrace any and all equivalent apparatus and articles.

What is claimed is:

1. An auxiliary casting reel and supportive mounting attachment for a fishing reel of the type having two spaced apart side plates connected together by elongated transverse frame posts comprising:

an auxiliary spool for holding a quantity of fishing line wrapped therearound;

a spool extension connected to and extending from a back surface of said spool;

an elongated adapter pivotally connected at one end thereof to said spool extension about a substantially transversely oriented pivotal axis therebetween and including first and second spaced apart substantially parallel and transversely oriented first and second grooves each sized in width and spaced apart for dependent engagement between two frame posts;

said first groove generally opening toward or away from said second groove, said second groove generally opening laterally with respect to a length of said adapter whereby said adapter is engageably positioned on the two frame posts by engaging said first groove against one of the frame posts and then pivoting said adapter about the first groove to engage said second groove around the other frame post whereby an axis of said auxiliary spool is oriented generally orthogonally to an axis of the fishing reel;

means for releasably locking said second groove on the other frame post.

2. An auxiliary casting reel supportive mounting attachment for a fishing reel of the type having two spaced apart side plates connected together by elongated transverse frame posts, said mounting attachment comprising:

an elongated adapter pivotally connected at one end thereof to a spool extension of the auxiliary casting reel about a substantially transversely oriented pivotal axis therebetween, said adapter including first and second spaced apart substantially parallel and transversely oriented first and second grooves each sized in width and spaced apart for dependent engagement between two frame posts;

said first groove generally opening toward or away from said second groove, said second groove generally opening laterally with respect to a length of said adapter whereby said adapter is engageably positioned on the two frame posts by engaging said first groove against one of the frame posts and then pivoting said adapter about the first groove to engage said second groove around the other frame post whereby said adapter is oriented generally orthogonally to an axis of the fishing reel;

means for releasably locking said second groove on the other frame post.

* * * * *